Aug. 22, 1961 G. M. REINSMITH 2,997,672

COUPLING OF RESONANT CIRCUITRY

Filed May 17, 1956

INVENTOR.
GLENN M. REINSMITH
BY Wade Koontz and Martin J. Finnegan
ATTORNEYS

United States Patent Office 2,997,672

Patented Aug. 22, 1961

2,997,672

COUPLING OF RESONANT CIRCUITRY

Glenn M. Reinsmith, Fayetteville, N.Y., assignor to the United States of America as represented by the Secretary of the Air Force Filed May 17, 1956, Ser. No. 585,585
2 Claims. (Cl. 333—24)

This invention relates to resonant circuitry and particularly to capacitive coupling in filter circuits employed to control bandpass operations.

An object of this invention is to provide a novel method of arranging resonant circuits so that the coupling between successive stages is of a capacitive nature solely, with all inductance effects eliminated from such coupling.

Another object of this invention is to provide, in a resonant system, wherein the coupling effect is limited to capacitive characteristics only, an arrangement of the interacting components in such manner that the magnitude of the capacitive coupling is readily adjustable.

A further object of this invention is to provide a novel capacitive coupling arrangement which constitutes the sole means for selecting the degree of coefficient of coupling between two resonant circuits and thereby controlling their bandpass operations.

By properly coupling resonant circuits, it is possible to obtain a response curve whose passband lies between two definite frequencies $f'_0$ and $f''_0$ neither one of which is zero. This is commonly termed a passband filter. The intermediate frequency amplifier transformers of the typical commercial broadcase receiver are familiar examples.

The frequency response characteristic depends on the Q's of the resonant circuits, the frequencies of the resonant circuits and the degree of coupling between the circuits. In practice it is desirable to provide means for initial adjustment of the frequencies of the resonant circuits and the degree of coupling so that these quantities can be set in test to result in the desired frequency response characteristic.

For a clear understanding of the manner by which the objects of the invention are achieved, reference may be made to the accompanying drawings, it being understood, however, that the specific illustration is for the purpose of disclosure only and places no limitation upon the invention.

Figure 1:
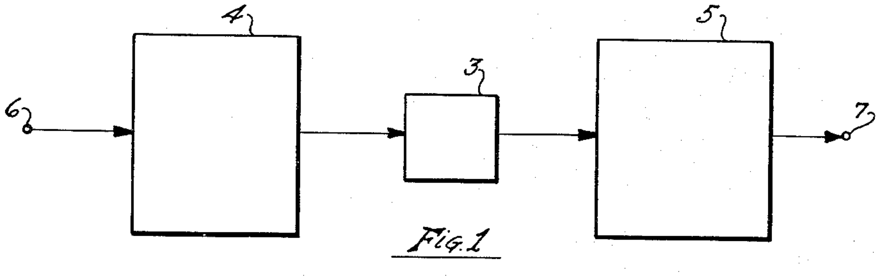
FIG. 1 shows a schematic representation of the invention.

In FIG. 1 is shown input terminal 6 adapted to receive input signals consisting of a band of frequencies. These signals are fed to a pair of resonant circuits 4 and 5. The resonant circuits 4 and 5 are interconnected by coupling means 3 consisting solely of capacitance. Output terminal 7 yields a response characteristic which is determined by the parameters of the aforegoing circuit.

The resonant circuits 4 and 5 are so designed as to make it possible to limit the capacitance value of the coupling means 3 to a relatively low magnitude. Preferably, this is done in the manner illustrated in FIG. 2 wherein resonant circuit 4 consists of variable inductance 8 in parallel with a series combination of capacitors 9 and 10. Similarly, the capacitive element of resonant circuit 5 consists of series capacitors 11 and 12 in parallel with variable inductance 13. The coupling means 3 is a capacitor and if the said capacitor's value is zero, there is no coupling between resonant circuits 4 and 5. Coupling means 3 is connected between resonant circuit 4 at point 14 and resonant circuit 5 at point 15. This in effect is a method of coupling two resonant circuits by means of an H arrangement of capacitive elements 9, 10, 11, 12, and 3. The most general and practical form of bandpass filter using the aforesaid method and means would include permeability trimmer control of inductances 8 and 13 plus a variable capacitor for coupling means 3.

Figure 2:
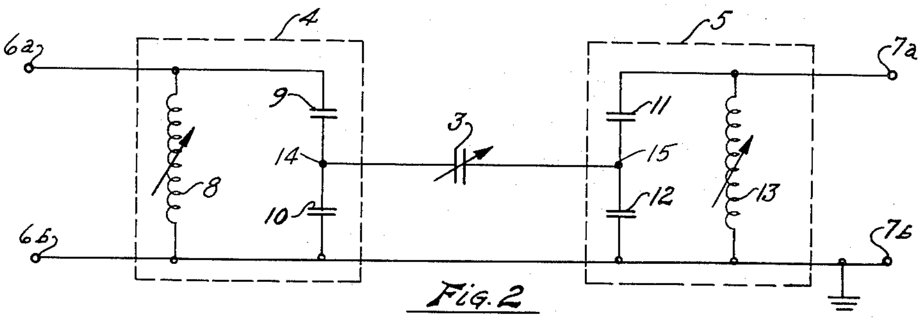
FIG. 2 shows one arrangement of electrical components and interconnections embodying the invention.

Both in FIGS. 1 and 2, the resonant circuits 4 and 5 are so arranged that all inductive effects therebetween are eliminated. One preferred method of eliminating inductive effects between resonant circuits 4 and 5 is by means of electro-magnetic shielding.

Figure 3:
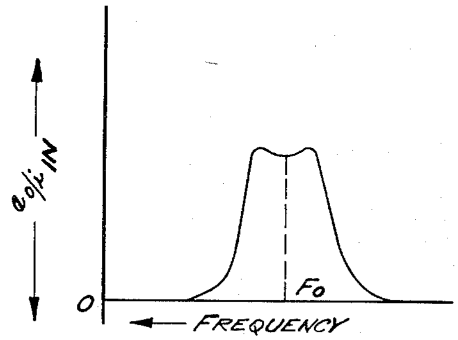
FIG. 3 is a graph showing one of the typically desirable frequency response characteristic when the invention is applied for passband filtering.

The coupling action between the said resonant circuits 4 and 5 is confined to capacitance effects only. A flat-topped frequency response characteristic as shown in FIG. 3 may be obtained. The width of the "flat-top" is primarily determined by the coefficient of coupling between the pair of resonant circuits 4 and 5. The said coefficient of coupling may be easily selected by coupling means 3 which is a variable capacitor.

While various embodiments of my invention have been disclosed as examples, it is understood that various modifications, within the conception of those skilled in the art, are possible without departing from the spirit of my invention or the scope of the claims.

What I claim is:

1. In a frequency selection system for use in radiant energy transmission, the combination with a pair of resonant circuits, each having shielding means individual thereto, of a single capacitor constituting the sole capacitive coupling means interconnecting said circuits, and capacitive means incorporated in each of said resonant circuits for confining said coupling means to said single capacitor, said last-named means including capacitors linked with said coupling means in such manner as to form a current flow pattern whose contour simulates the letter H, with the capacitors of the respective resonant circuits forming the two legs of the H pattern, and with the said coupling means forming the central bridge of the H pattern.

2. A tuned band pass network comprising a pair of resonant circuits, each including a variable inductance and two relatively high capacitors in series, the said capacitors being arranged across the said inductor to achieve parallel resonance therewith, shielding means for each of said pair of resonant circuits to reduce their mutual inductance to zero, and capacitive means common to said resonant circuits, said means constituting the sole coupling between said circuits and consisting of a low-value capacitor linked with aforesaid series capacitors in such a manner as to form the central bridge of an H pattern.

References Cited in the file of this patent

UNITED STATES PATENTS

| | | |
|---|---|---|
| 2,018,140 | Low | Oct. 22, 1935 |
| 2,026,661 | Trevor | Jan. 7, 1936 |
| 2,040,426 | Bonanno | May 12, 1936 |
| 2,632,803 | Cotsworth | Mar. 24, 1953 |

FOREIGN PATENTS

| | | |
|---|---|---|
| 88,575 | Sweden | Feb. 23, 1937 |